March 3, 1931. J. H. BRENNER 1,794,438
DYNAMIC BALANCER FOR CRANK SHAFTS
Filed Oct. 19, 1929 2 Sheets-Sheet 1
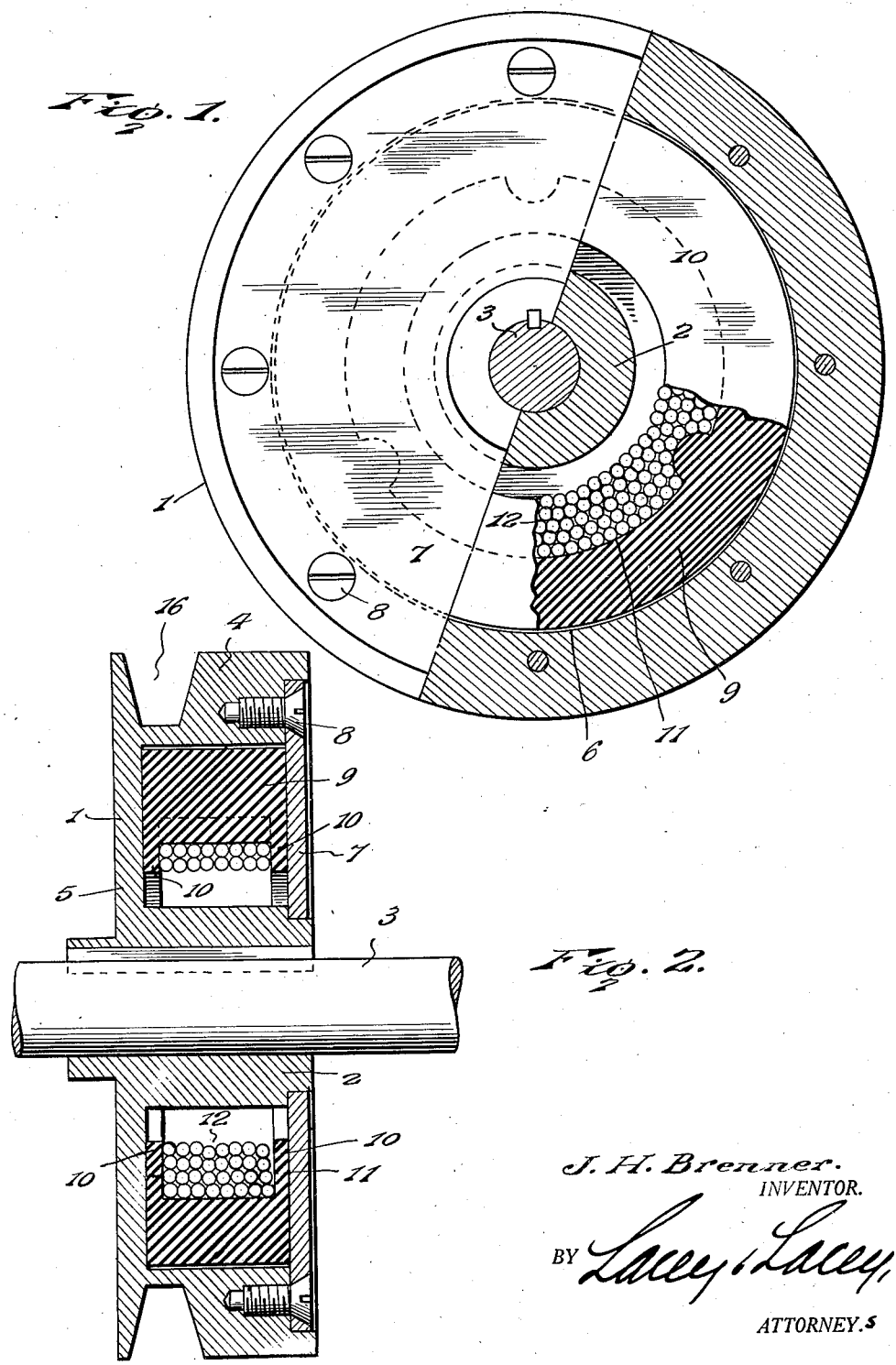
J. H. Brenner.
INVENTOR.
BY Lacey & Lacey
ATTORNEYS March 3, 1931. J. H. BRENNER 1,794,438
DYNAMIC BALANCER FOR CRANK SHAFTS
Filed Oct. 19, 1929  2 Sheets-Sheet 2
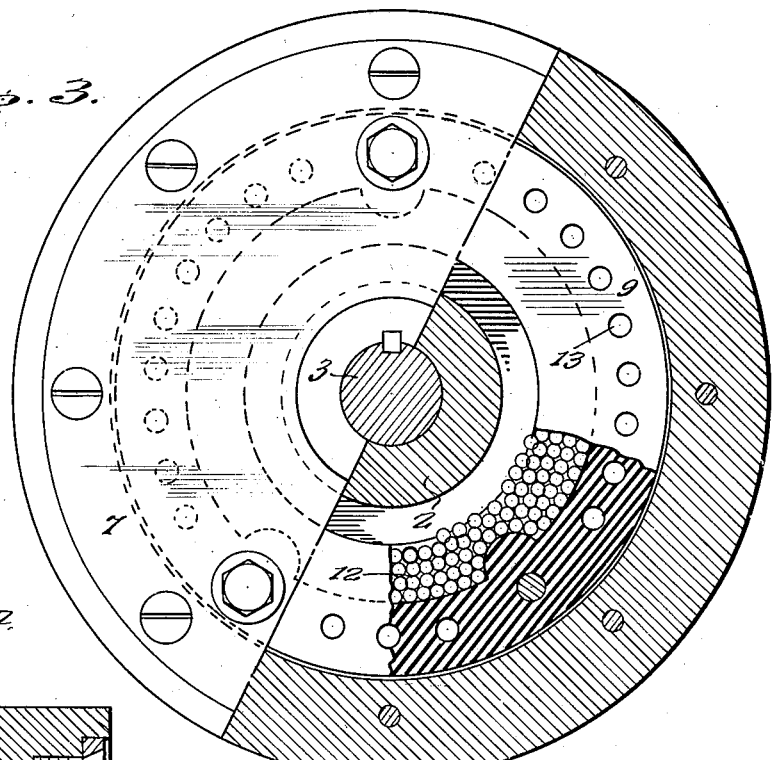
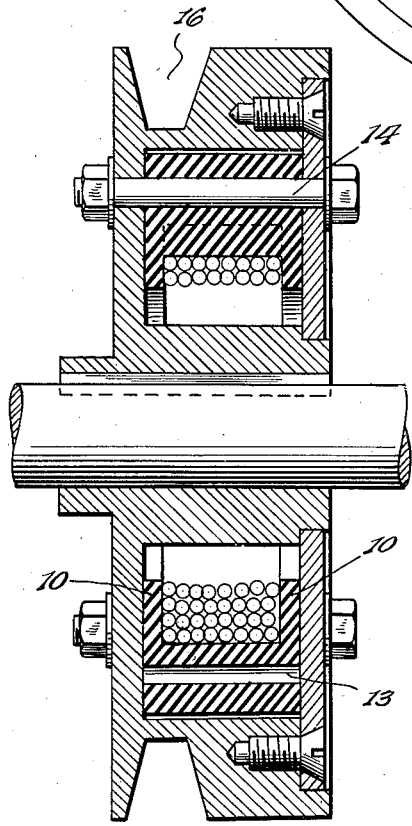
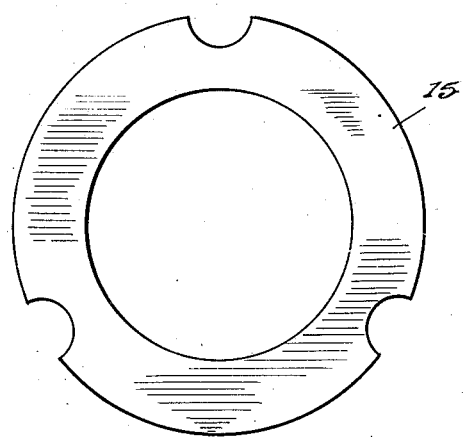
J. H. Brenner.
INVENTOR.
BY
ATTORNEYS Patented Mar. 3, 1931

1,794,438

UNITED STATES PATENT OFFICE

JOHN H. BRENNER, OF NEBRASKA CITY, NEBRASKA

DYNAMIC BALANCER FOR CRANK SHAFTS

Application filed October 19, 1929. Serial No. 400,991.

The present invention is directed to improvements in dynamic balancers for eliminating torsional and longitudinal vibration in a rotating shaft.

The primary object of the invention is to provide a device of this character more particularly designed for use in connection with the crank shaft of an internal combustion engine.

Another object of the invention is to provide a device of this character which may be conveniently connected with the crank shaft of a multi-cylinder engine and when in place thereon will eliminate vibration at various engine speeds.

It is a well known fact that when the front piston of a multiple cylinder engine is on its power stroke it imparts a pronounced twist or torsional strain upon the shaft, imparting vibration thereto which increases toward the flywheel and it is to eliminate such vibration that the present invention has been perfected.

Another object of the invention is to provide a device of this kind which is extremely simple in construction, efficient in operation, and one which will prevent excessive vibration of the crank shaft at, if necessary, any engine speed.

With these and other objects in view, the present invention resides in the novel features of construction, formation, combination and arrangement of parts to be hereinafter more fully described, claimed and illustrated in the accompanying drawings, in which:

Figure 1 is an end view of the device, partly broken away and partly in section.

Figure 2 is a sectional view therethrough.

Figure 3 is an end view, with parts broken away, showing a slightly modified form of the invention.

Figure 4 is a transverse sectional view through Figure 3.

Figure 5 is a plan view of a modified form of weight.

Referring to the drawings, 1 designates a cylindrical casing having a concentric hub 2 which is fixed to the crank shaft 3 in any suitable manner. The crank shaft, in this instance, is that of a multiple cylinder internal combustion engine, the shaft, as is customary, being equipped at one end with a flywheel (not shown).

The rim 4 of the casing is cast integral with a wall 5 which is integrally connected with one end of the hub 2 and since the hub is concentrically disposed within the rim, an annular chamber 6 is provided within the casing. A removable cover plate 7 is provided and is detachably connected with the casing by bolts 8.

Confined in the chamber 6 is a comparatively soft rubber ring 9 which encircles the hub 2 and is provided with side flanges 10 which engage against the wall 5 and cover plate 7, while the outer periphery of the ring is adapted to frictionally engage the inner periphery of the rim 4 in a manner to be hereinafter described. By providing the flanges 10, an annular groove 11 is provided in which a number of balls or shot are placed, which, en masse, constitute a movable or floating weight 12 exerting its power upon the ring 9 and flanges 10 to cause the same to frictionally engage the rim 4, wall 5 and cover plate 7. Obviously, when the shaft 3 is rotated at relatively low speeds, the force of the weight will be exerted laterally upon the flanges 10 to cause the same to frictionally engage the casing. When the speed of the shaft is increased the centrifugal force will cause the weight to exert its force upon the ring 9, and due to its frictional engagement with the rim 4, the power of the weight is increased, thereby absorbing the torsional and longitudinal vibrations imparted to the shaft.

In Figures 3 and 4 of the drawings, a slightly modified form of the invention is illustrated wherein the ring 9 is provided with a plurality of transverse openings 13 in order that the ring will flex more readily. In this form of the invention the ring may be secured by bolts 14.

In Figure 5, another modified form of the invention, the weight consists of a metallic ring 15 which may be substituted for the weight 12.

The casing is purposely provided with an annular groove 16 to receive a belt for driving the fan.

It is well known that torsional vibration is developed principally by the front cylinder of an engine and when the first cylinder receives its power impulse, the torque is transmitted through the crank shaft to the flywheel, due to the inertia of the flywheel, thus causing a twisting strain upon the crank shaft. The twisting effect diminishes, of course, the closer the cylinder receiving the power impulse is to the flywheel. The time period of the power impulses and the torsional vibrations will be practically in phase at various engine speeds, which makes them objectionable and of destructive proportions. To overcome these defects the device is so constructed that it will absorb the energy thus generated and prevent vibration from becoming excessive at any engine speed.

From the foregoing, it is thought that the operation and many advantages of the herein described invention will be apparent to those skilled in the art, without further description, and it will be understood that various changes in size, shape, proportion and minor details of construction may be resorted to without departing from the spirit or sacrificing any of the advantages of the invention.

The ring 9 is preferably formed from comparatively soft rubber but it will be of course understood that any other material having similar elastic and resilient characteristics may be substituted therefor, if desired.

What is claimed is:

1. The combination with a rotating shaft, of a casing fixed thereto, an elastic ring mounted in the casing, and a plurality of balls in the casing constituting a weight when en masse for expanding the ring under centrifugal action into engagement with the casing.

2. The combination with a rotating shaft, of a casing fixed thereto, an elastic ring confined in the casing having spaced flanges carried thereby and defining an annular groove, a plurality of balls in the groove constituting a weight when en masse, said weight being movable in the groove and exerting lateral stress upon the flanges to cause the same to frictionally engage the casing at slow speeds of the shaft and to exert pressure upon the ring radially by centrifugal force at higher shaft speeds, as and for the purpose set forth.

3. The combination with a rotating shaft, of a casing fixed thereto and rotatable therewith, an elastic ring mounted in the casing, and a weight confined in the ring for exerting lateral pressure upon parts thereof when the shaft is rotating at low speed and to exert radial pressure thereon when the shaft is rotating at high speed.

4. Means for neutralizing torque and vibration of a rotating shaft consisting of a hollow member rotatable with the shaft, a continuous ring within said member expansible radially and laterally due to variable speeds of the shaft to increase or decrease the frictional contact between the said ring and member, and a weight loose within the ring and operable by rotation of the shaft to effect expansion of the said ring.

In testimony whereof I affix my signature.

JOHN H. BRENNER. [L. S.]